Patented Nov. 23, 1948

2,454,709

UNITED STATES PATENT OFFICE 2,454,709

ALGINATE IMPRESSION MATERIAL CONTAINING CHROMIC SULFATE

Eugene J. Molnar, Toledo, Ohio, assignor to Montclair Research Corporation, a corporation of New Jersey No Drawing. Application January 9, 1946, Serial No. 640,135

12 Claims. (Cl. 18—47)

This invention relates to impression materials, that is materials for taking exact impressions of structures for the purpose of reproducing them in plaster or other materials, and particularly to dental impression materials, to substances and compositions for such purposes, and to methods of making such substances and compositions.

The requirements for impression material are rather exacting if such materials are to be employed in the production of exact replicas. They should be easily brought into condition for use; they should desirably not require heat for such purpose; they should be of such physical condition that they can be inserted into cavities and fissures and readily removed therefrom without mutilation or destruction when set; they should set in a suitable time, not too short to prevent proper manipulation in application, nor so long as to cause discomfort to a dental patient; they should form a sharp, accurate impression of the structure to which they are applied; they should set to a tough rubbery or flexible state so that they can be stripped from the structure to which they have been applied even when undercuts are present; and the dry powder composition should be stable over a substantial period of time before mixture with water for use.

But few compositions have been found to be even usable in the art. In some of them compressional strength is obtained at a sacrifice of flexibility. In alginate compositions with calcium borate, the gel obtained is not very satisfactory since it possesses a loose, open structure and also because the borate ion is a strong plaster retarder. The compositions are for the most part based on water soluble alginates in combination with salts and fillers, the salt acting to produce the setting. While alginates may be precipitated from aqueous solution by a wide variety of materials, very few of them give compositions that are of any practical utility and many of them are subject to defects of the character pointed out and others. Prediction is of little value and actual test is required to determine the actual value of such compositions for the exacting requirements in this field. Whether or not the set obtained is weak or strong, and all of the other factors such as those referred to above, since both the cations and anions present affect the properties, must be investigated.

Among the objects of the present invention is the production of impression materials that possess all of the required properties for impression materials without the defects enumerated above. Other objects include the production of such impression materials which possess both high compressional strength and extreme flexibility in the set material produced from them.

Many other objects and advantages of the invention will appear from the more detailed description set forth below, it being understood that such more detailed description is given by way of illustration and explanation only, and not by way of limitation, since various changes therein may be made by those skilled in the art without departing from the scope and spirit of the present invention.

In accordance with the present invention it has been found that satisfactory impression materials, which meet the requirements for even dental use, may be produced from water soluble alginates and chromic sulfate, which form the basis for compositions produced under this invention. Generally a filler is included; and other substances usually in minor amount to retard or accelerate set or otherwise influence the properties may be included.

The alginates require little discussion since they have been exploited for use for these purposes and any of the water soluble alginates may be employed, such as sodium alginate, potassium alginate, ammonium alginate, or mixtures of them. The sodium alginate is sufficiently exemplary and will be used below for illustrative purposes.

While chromic sulphate is a salt of most outstanding value in these compositions, it exists in a variety of forms which are not all equally effective for these purposes. Of these varieties, the most important for use in compositions made under this invention, may be characterized as the green chromic sulphates which are hydrated salts. In their most desirable form, they contain at least one sulphate which does not precipitate with barium chloride, and there may be one, two, or three such unreactive sulphate groups present. Those having from 5 to 8 mols of water of hydration are particularly valuable, and a specific salt of that character is the chromic sulphate having a $SO_4/Cr_2O_3$ ratio of about 2.9/1 and having 7.4 mols of water of hydration. In general any deliquescent chromic sulphate is not desirable, but the non-deliquescent salts may be used. Any of the hydrated chromic sulphates may be used, including the violet colored salt with 18 mols of water of hydration, if first heat treated as for example at temperatures of from 90 to 150° C. or preferably from 90 to 110° C., to convert them into lower hydrates, particularly of green color. The rose colored anhydrous salt is not effective within the standards herein above set forth and for use should be converted into a hydrated material.

While the chromic sulphate employed may be produced in any desired way as for example heat treatment of higher hydrates within temperature ranges as indicated above for periods of say about five hours, or by direct preparation in appropriate ways, the following example will illustrate one manner of preparation of a satisfactory material for use herein. But as explained above no limitation is intended in giving this example.

Sulphur dioxide gas is passed into an aqueous solution of $CrO_3$ until substantially no further reaction occurs. The resulting solution is slowly evaporated and the crystals obtained dried at about 180° F. for about 24 hours, while mixing every hour to expose the material evenly to the heat. Or vacuum may be used.

A chromic sulphate particularly effective for use in the present invention showed the following analysis:

|  | Per cent |
|---|---|
| $Cr_2O_3$ | 26.17 |
| Basicity | 21.77 |
| Acidity (as $H_2SO_4$) | 39.69 |
| Total $SO_4$ | 47.60 |
| $Fe_2O_3$ and $Al_2O_3$ | .34 |
| $H_2O$ (105° C. overnight) | 11.56 |
| $Cl_2$ | None |

As fillers, any substantially water-insoluble powder can be used such as calcium or magnesium carbonate, in their heavy or light forms, magnesium oxide, zinc oxide, clays, diatomaceous earth, chalk, bentonite, mica, asbestos, volcanic ash, hard waxes, and the like. Such filler usually makes up the bulk of the composition and has some influence on the final physical properties of the gel, influence the setting time somewhat, the working properties of the paste, and the fineness of the impression. Some fillers may exert a particular property of value in some cases, as for example, the use of volcanic ash to give smoothness and to improve hardness.

Other substances may be included usually in minor amounts to affect the properties of the ultimate composition or of the gel produced. Rosin and its derivatives may be used to improve workability and shelf-life by protecting the ingredients against moisture. Small amounts of retarding or of accelerating agents may be employed but are not necessary. Small amounts of soluble salts which give acid reaction in water solution, particularly acetates, sulfates, and chlorides (such as aluminum acetate, manganese sulphate or lead chloride) may improve hardness.

The proportions of the basic ingredients, namely alginate, chromic sulphate, and filler may vary but should be those which give a desired gel structure when the material sets from the paste made with it and water. For dental and certain other purposes, a weak gel structure would not be desirable, while for some other purposes it might be usable. In general, when a heat treated chromic salt is used, it should exceed the alginate, while the non-heat treated salt should be used in lesser quantity than or equal to the alginate. The heat treated material is usually smoother. Workable proportions will usually fall within the ratios of 0.7–1.5 parts of salt to 1.0–1.5 parts of sodium alginate. General overall proportions of the three main ingredients will usually lie within from 5 to about 15% sodium alginate, from about 6 to about 15% chromic sulphate, with the balance filler or mixtures of filler less any added special ingredients. Such relative proportions depend on the nature of the filler, the particular proportions stated being based on magnesium carbonate. With a very heavy filler such as lead oxide, the proportions of active ingredients would generally be lower. Rosin and its derivatives for example, may be used in proportions of one to ten per cent. The percentage proportions given above are in weight based on the dry composition as packaged.

These compositions are mixed with water for use and the amount of water may vary. Examples of compositions as given below may be used in the ratio of about 50 parts water to 21 parts composition, by weight. Mixing, charging, and setting times will necessarily vary but exemplary periods are mixing time, 1 minute; charging the impression tray, 1 minute; setting time, 3 minutes; which, for example, apply to the fourth example given below.

The gels produced with the compositions of the present invention exhibit remarkable properties for the purposes in hand. They show extraordinary compressional strength in combination with extreme flexibility. One of the preferred highly flexible materials produced in accordance with the present invention exhibited a compression strength of more than 12 pounds while two of the most widely sold commercial materials failed at 7–9 pounds. The gels show a fine, very dense structure which makes for accurate impression and increases the toughness. No retarders like phosphate retarders commonly used in certain compositions, are required. The compositions do not discolor the saliva. They do not require the use of any fixing or tanning bath.

The following examples illustrate the invention, parts being by weight unless otherwise indicated.

I

| | |
|---|---|
| Magnesium carbonate (heavy) | 60 |
| Volcanic ash | 6 |
| Chromic sulphate | 7.5 |
| Sodium alginate ("Algin") | 7.5 |
| Manganese sulphate | .0015 |

II

| | |
|---|---|
| Magnesium carbonate (heavy) | 66 |
| Chromic sulphate | 7.5 |
| Sodium alginate | 7.5 |
| Poly Pale Resin (Hercules Powder Co.) | 3.6 |
| Aluminum acetate (basic) | 2.0 |

III

| | |
|---|---|
| Magnesium carbonate (heavy) | 60 |
| Chromic sulphate | 6 |
| Sodium alginate | 6 |

IV

| | |
|---|---|
| Magnesium carbonate (heavy) | 20 |
| Sodium alginate | 1.2 |
| Chromic sulphate (commercial, heat treated at 200° F. for 5 hours) | 1.8 |

The shelf life of all such impression materials may be greatly increased by packaging the setting agent such as the cromic sulphate separately from the alginate, while the filler and other ingredients may be placed with either of such separate entities or distributed between them. Heat treated cromic sulphate may thus be separately packaged with or without filler, etc., and the alginate also separately packaged with or without filler, etc. Each package or envelope may contain the respective materials in such proportions as to give the desired composition when mixed. A pair of such packages or envelopes may be sold as an entity. Or a single package may be made up in which the setting agent and alginate are separately maintained. For use the chromic sulphate package may be dissolved in water and the other ingredients then incorporated. For such use the amount of chromic sulphate may desirably be greater than set forth above and may be for example an amount which will give 15–20% based on the weight of the total dry composition. This statement does not, however, preclude the use of greater or less amounts.

Having thus set forth the invention, there is claimed:

1. An impression material comprising water soluble alginate and a green chromic sulphate in proportions to give gel structure when set from a paste with water.

2. An impression material comprising water soluble alginate, a green chromic sulphate, and a filler, in proportions to give gel structure when set from a paste with water.

3. An impression material comprising water soluble alginate, a hydrated chromic sulphate having from 5 to 8 mols of water of hydration, and a filler, in proportions to give gel structure when set from a paste with water.

4. An impression material comprising water soluble alginate, a non-deliquescent chromic sulphate, and a filler, in proportions to give gel structure when set from a paste with water.

5. An impression material comprising water soluble alginate, a hydrated chromic sulphate heat treated at from about 90 to 150° C., and a filler, in proportions to give gel structure when set from a paste with water.

6. An impression material comprising water soluble alginate, a green chromic sulphate having a $SO_4$ to $Cr_2O_3$ ratio of 2.9/1 and having about 7.4 mols of water of hydration, and a filler, in proportions to give gel structure when set from a paste with water.

7. An impression material as set forth in claim 2 including a rosin in an amount to improve workability.

8. An impression material as set forth in claim 2 including a moisture protecting ingredient.

9. An impression material as set forth in claim 2 including an ingredient to improve hardness of the gel.

10. An impression material as set forth in claim 1 in which the ratio of sulphate to alginate is about 0.7–1.5 parts of sulphate to about 1.0–1.5 parts of alginate by weight.

11. An impression material as set forth in claim 2 in which the proportions are from about 5 to about 15% alginate, from about 6 to about 15.0% sulphate, and balance filler.

12. The method of making impression material which comprises heating a hydrated chromic sulphate at a temperature of from 90° to 150° C., and mixing said heated product with water soluble alginate and filler in proportions to give gel structure when set from a paste with water.

EUGENE J. MOLNAR.

REFERENCES CITED

The following references are of record in the file of this patent:

UNITED STATES PATENTS

| Number | Name | Date |
|---|---|---|
| 1,977,580 | Grier | Oct. 16, 1934 |
| 2,078,808 | Reardon | Apr. 27, 1937 |
| 2,158,487 | Preble | May 16, 1939 |
| 2,249,694 | Wilding | July 15, 1941 |
| 2,345,255 | Gross | Mar. 28, 1944 |
| 2,390,137 | Vallandigham | Dec. 4, 1945 |